United States Patent [19]

Fox et al.

[11] Patent Number: 4,815,896
[45] Date of Patent: Mar. 28, 1989

[54] DEEP SEA SHARK CABLE PROTECTORS

[76] Inventors: Nelson C. Fox; Rosetta V. G. Fox, both of Anchorage View Lane, Ferry Beach, St. Georges, Bermuda

[21] Appl. No.: 909,877

[22] Filed: Sep. 22, 1986

[51] Int. Cl.⁴ .............................................. F16L 1/00
[52] U.S. Cl. .................................. 405/158; 174/136; 405/157; 405/211
[58] Field of Search .................. 405/154, 211; 52/101; 174/136; 47/25; 403/312

[56] References Cited

U.S. PATENT DOCUMENTS

| | | | |
|---|---|---|---|
| 1,512,618 | 10/1924 | McDonald | 52/101 X |
| 1,996,894 | 4/1935 | Alvord | 52/101 X |
| 2,938,244 | 5/1960 | Christensen | 256/11 X |
| 3,362,115 | 1/1960 | Nyhus et al. | 52/101 |
| 3,611,651 | 10/1971 | Carlson | 52/101 |
| 3,846,030 | 11/1974 | Katt | 403/312 X |
| 4,109,941 | 8/1978 | Wood et al. | 403/312 X |
| 4,110,944 | 9/1978 | Carlson | 52/101 |
| 4,309,072 | 1/1982 | Tweeddale | 174/136 X |

*Primary Examiner*—Dennis L. Taylor
*Attorney, Agent, or Firm*—Berman, Aisenberg & Platt

[57] ABSTRACT

Deep sea shark cable protectors of the invention are lengths of pipe which encircle the cable, having a plurality of spaced apart spikes extending outwardly around the circumference of the pipe to prevent the shark from gripping the cable in its mouth. The lengths of pipe are hinged and have closures for securing the pipe sections, and the pipe lengths may be made of brass or other materials. The spikes may extend from around the outer surface of the pipe or may extend from the outer perimeter of clamps which encircle the cable or which encircle and/or join pipe sections.

3 Claims, 2 Drawing Sheets

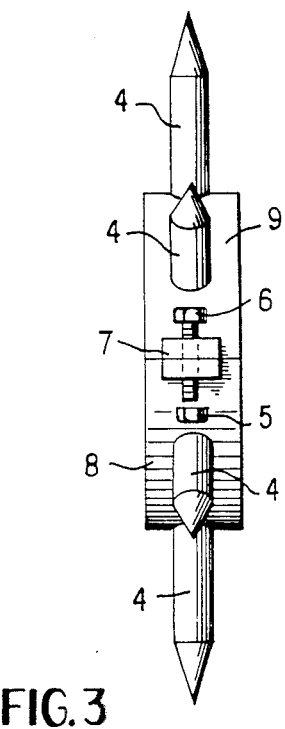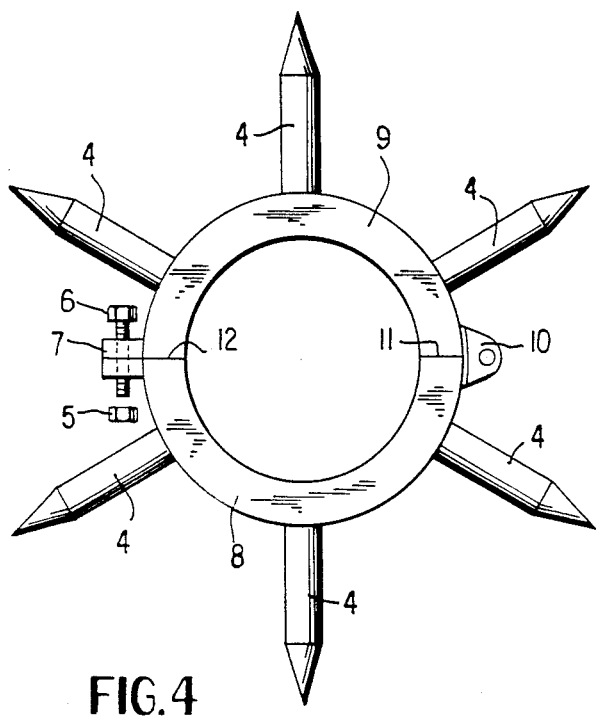
FIG.3   FIG.4
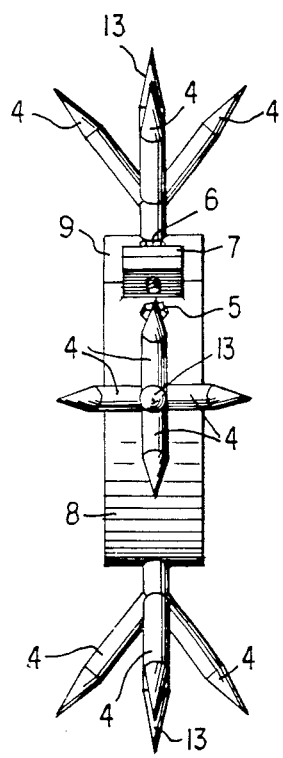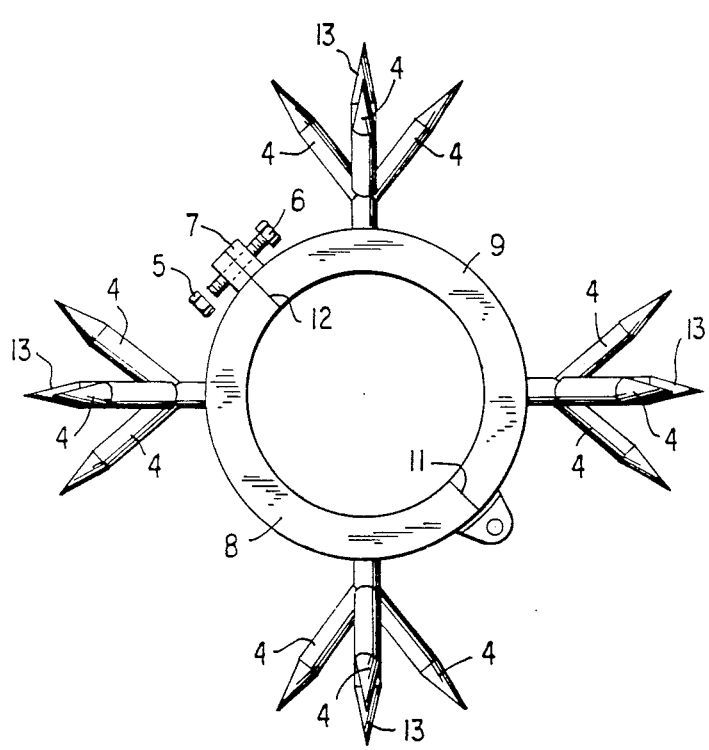
FIG.5   FIG.6

DEEP SEA SHARK CABLE PROTECTORS

FIELD OF THE INVENTION

The invention relates to underwater cable protection.

BACKGROUND OF THE INVENTION

Underwater cables are constantly being attacked by sharks and damaged or destroyed. Cable companies, particularly telephone companies are greatly inconvenienced by damaged cables. Sharks grip a substantially smooth surfaced object in the same way that a dog bites a ball but cannot get a grip on a spiked surface.

SUMMARY OF THE INVENTION

Deep sea shark cable protectors of the invention are lengths of pipe which encircle the cable, having a plurality of spaced apart spikes extending outwardly around the circumference of the pipe to prevent the shark from gripping the calbe in its mouth. The lengths of pipe may have closures for securing the pipe sections, and the pipe lengths may be made of brass or other materials.

The spikes may extend from around the outer surface of the pipe or may extend from the outer perimeter of clamps which encircle the cable or which encircle and join pipe sections.

BRIEF DESCRIPTION OF THE DRAWINGS

FIG. 3 is a side view of a circumferential clamp having spikes attached.

FIG. 4 is a plan view of a circumferential clamp having spikes attached.

FIG. 5 is a side view of another circumferential clamp of the invention.

FIG. 6 is a plan view of a clamp of FIG. 5.

DETAILED DESCRIPTION OF THE INVENTION

Figure 1:
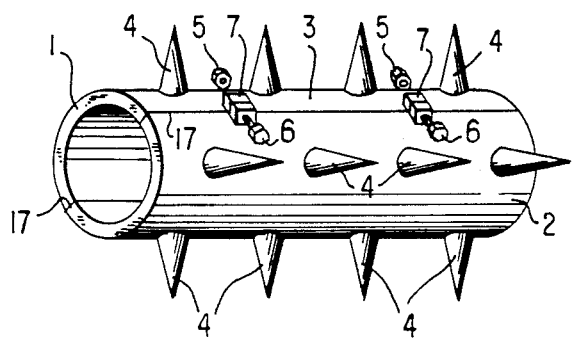
FIG. 1 is a perspective view of a pipe of the invention having spikes attached thereto.
Figure 7:
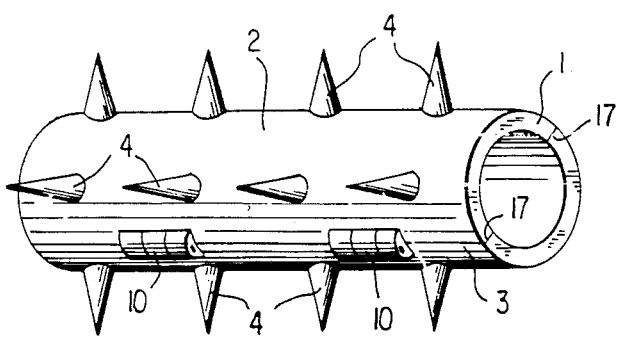
FIG. 7 is another perspective view of the pipe of FIG. 1.

With reference to the figures in which like numerals represent like parts, FIGS. 1 and 7 show one embodiment of the invention in which brass pipe 1 has two sections 2 and 3. The two sections of pipe 1 are secured together at edges 17 to form a sleeve around a cable to be protected. Pipe sections 2 and 3 may be hinged together by hinges 10, shown in FIG. 7, and may be secured by one or more fastenings such as eyelet closure 7 which is secured by a screw or bolt 6 tightly engaged by nut 5. Several eyelet closures 7 may extend along the length of pipe 1, as necessary. Bolt 6 passes through each of these eyelets before being engaged with nut 5 which is tightened to secure the two pipe sections 2 and 3 together.

A plurality of spikes 4, which may be brass or other suitable material, extend from the outer surface of pipe sections 2 and 3 a sufficient length to be impaled on the inside of the mouth of a shark and prevent the shark from closing its mouth and chewing on the pipe or cable covering.

Figure 2:
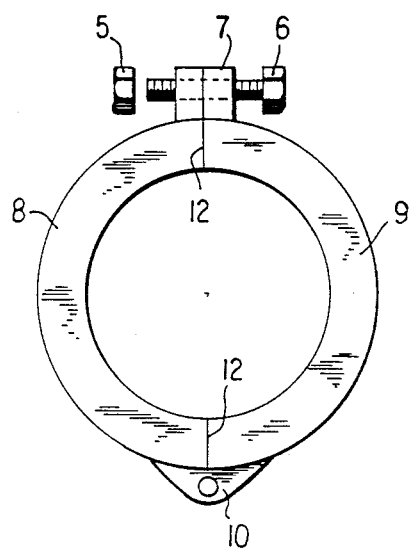
FIG. 2 is an end view of a clamp for connecting lengths of pipe of FIG. 1.

FIG. 2 shows an end view of a clamp which joins ends of two adjacent pipes shown in FIGS. 1 and 7. Clamp sections 8 and 9 are hinged at 10 and secured at eyelet closure 7 by tightening nut 5 on bolt 6.

FIGS. 3 to 6 show clamps having spikes 4 extending from a ring-type clamp which encircles the cable or pipe and has two sections 8 and 9 joined by hinge 10. Eyelet portions 7 are joined by screw or bolt 6 which engages nut 5 for securing the clamp around the cable to be protected or for joining adjacent pipe sections. End portions 11 and 12 of clamp portions 8 and 9 are joined when the clamp is secured.

FIG. 3 shows a side view of a clamp, shown in end view in FIG. 4, having spikes 4 extending at intervals from the outer perimeter of the clamp.

FIGS. 5 and 6 show another embodiment of the invention in which spike 4 is a compound spike having spike portions 13 extending perpendicularly from the circumference of the clamp and a plurality of spikes 4 extending angularly outwardly therefrom. This multiple spike portion is attached, for example, to clamp portion 9 at position 16, and may be attached by screwing the spike into the ring portion of the clamp, or the entire clamp and spike section may be molded in one piece, or the spike portion may be attached by another known method.

Lengths of pipe section of FIGS. 1 and 7 may be secured together around the cable with clamps of FIGS. 2 to 6, or the clamps of FIGS. 3 to 6 may encircle the cable at intervals. Suitable dimensions for the pipes and clamps will be apparent to one skilled in the art.

The pipe and clamps of the invention prevents a shark from closing its mouth around the cable and therefore, prevent the shark from damaging or destroying the cables. The pipe sections, clamps and spikes may be made from brass or other suitable material, and spacing thereof will be apparent to one skilled in the art.

While the invention has been described above with respect to certain embodiments thereof, it will be appreciated that variations and modifications may be made without departing from the spirit and scope of the invention.

We claim:

1. A deep shark cable protector comprising:
    tubular means for encircling an underwater cable, spike means extendig outwardly from the tubular means for preventing sharks from damaging the underwater cable, and clamp means for joining the tubular means,
    wherein the clamp means comprises a plurality of spikes attached to and extending outwardly from the clamp means.

2. A cable protector of claim 1 comprising a plurality of spaced apart spike means.

3. A cable protector of claim 1 wherein at least one of the spike means comprises a plurality of spikes.

* * * * *